Feb. 3, 1970 C. H. RICHARDS 3,493,681

MULTIPLE CHANNEL AUDIO SYSTEM

Filed April 13, 1966 2 Sheets-Sheet 1

INVENTOR.
CHARLES H. RICHARDS

BY

Morgan, Finnegan, Durham & Pine
ATTORNEYS.

MULTIPLE CHANNEL AUDIO SYSTEM

Filed April 13, 1966

INVENTOR.
CHARLES H. RICHARDS
BY
Morgan, Finnegan, Durham & Pine
ATTORNEYS.

United States Patent Office 3,493,681
Patented Feb. 3, 1970

3,493,681
MULTIPLE CHANNEL AUDIO SYSTEM
Charles H. Richards, 1199 Park Ave., New York, N.Y. 10028
Filed Apr. 13, 1966, Ser. No. 542,409
Int. Cl. H04m 9/08
U.S. Cl. 179—1 3 Claims

ABSTRACT OF THE DISCLOSURE

A multiple channel audio system responsive to the absence of an audio signal for a predetermined period of time to fade out one channel and fade in the other. A timer is used to periodically reduce the gain in one channel, preferably a music channel, and to induce a change to the other channel, preferably a recorded message channel. The absence of an audio signal at the end of a recorded message causes the system to switch back to the first channel.

This invention relates to audio systems and more particularly to systems for switching between a plurality of audio channels.

There are many commercial establishments such as supermarkets that have a background music system to provide a pleasant atmosphere for customers. Often the music system is also used as a public address system which permits the owner of the establishment to make various announcements such as mentioning the "specials" of the day. These announcements are made by manually plugging a microphone into the amplifier system and, as a result, the announcement is preceded by a disturbing clicking or static as the system is switched from music to public address and vice versa.

An object of this invention is to provide a system for automatically switching between a plurality of audio channels.

Another object is to provide an audio system for automatically interrupting background music to make various announcements without requiring an announcer.

Another object of the invention is to provide a system that automatically fades out one audio channel, switches to an alternate channel and then gradually fades in the alternate channel.

Still another object is to provide an audio system that will periodically interrupt the background music to interject a recorded announcement of any desired length, and which will automatically switch back to the music channel at the termination of the announcement.

The system in accordance with the invention includes, for example, a pair of audio channels that are fed to a common amplifier via separate gain control circuits. A flip flop circuit is used to activate one or the other of the gain control circuits, an amplitude level detector responsive to the signal level in the amplifier is used to change the state of the flip flop circuit whenever the signal level becomes substantially zero. When an announcement is to be made, the gain in the gain control circuits is gradually reduced automatically to fade out the background music, the level detector then responds to the absence of a signal in the amplifier to switch channels, and thereafter the gain control circuits operate automatically to increase the gain and fade in the alternate channel. Where one of the channels provides recorded announcements, the pause at the end of the announcement is detected by the level detector and automatically switches the system to an alternate channel.

Figure 1:
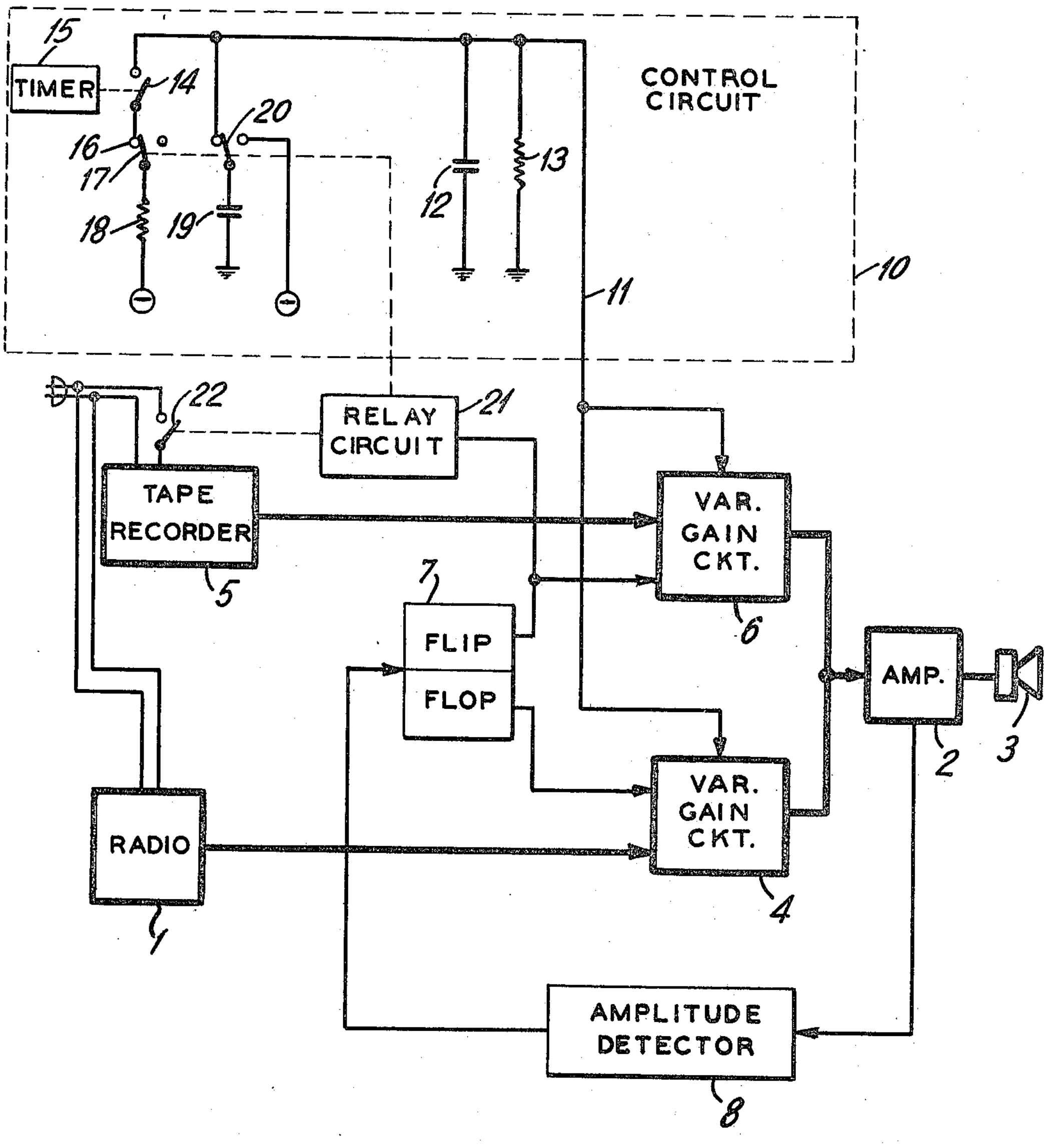
Figure 2:
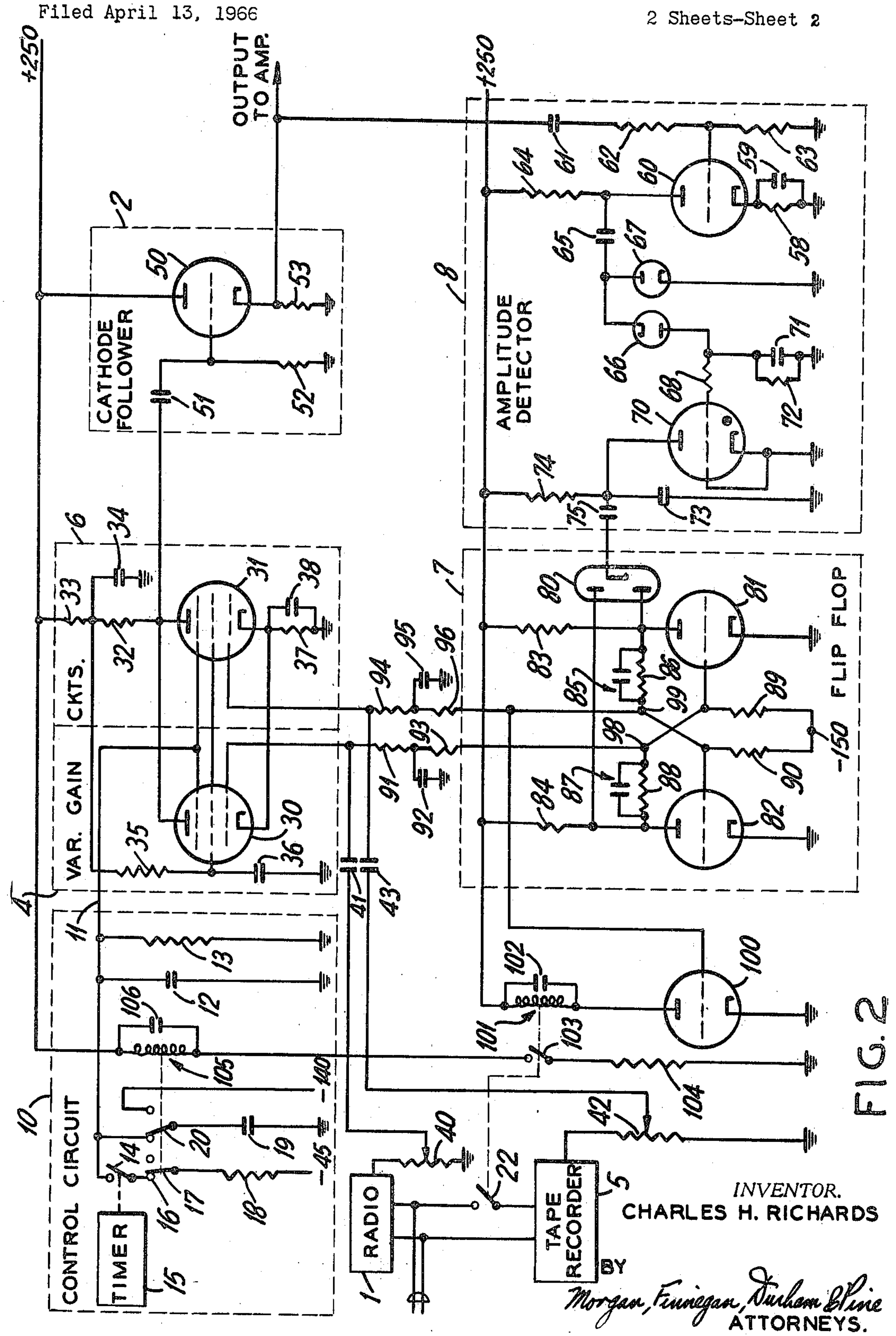

The foregoing and other objects will become more apparent from the following specification which sets forth an illustrative embodiment of the invention. The drawings form part of the specification wherein:

FIGURE 1 is a schematic block diagram of the system in accordance with this invention; and FIGURE 2 is a detailed schematic diagram of the same system.

The portion of the system shown in bold outline in FIGURE 1 represents the audio signal paths. One channel can be a background music source such as from an FM radio 1 tuned to a suitable music station. Radio 1 is coupled to an output amplifier 2 and speaker 3 via a variable gain circuit 4. The other channel can be used to provide recorded announcements and would include a tape recorder 5 which is similarly coupled to the output amplifier 2 via separate variable gain circuit 6. Typically, the tape recorder would include a tape having recorded thereon several announcements. A flip flop circuit 7 is connected to variable gain circuits 4 and 6 to selectively activate one or the other of these circuits to thereby select one of the channels. An amplitude detector circuit 8 is connected between amplifier 2 and the trigger input of flip flop circuit 7. In response to an insignificant signal in amplifier 2, the amplitude detector circuit provides an output pulse to the trigger input of flip flop circuit 7 which changes the state of the flip flop circuit and thereby activates the alternate one of the variable gain circuits. An insignificant signal situation arises when the signal level is below a predetermined amplitude for a period of time which is longer than the normal signal pauses.

Control circuit 10 is coupled to variable gain circuits 4 and 6 via a conductor 11 and is operative to initiate the switching between channels and to control the fade out and fade in during the transition period. In the absence of a signal on conductor 11 the gain of circuits 4 and 6 is at a maximum and gradually decreases as the signal on conductor 11 becomes increasingly negative.

The control circuit includes a capacitor 12 and resistor 13 connected in parallel with one another between conductor 11 and ground. The contacts 14 of a timer 15 are connected between a stationary contact 16 and conductor 11, the movable contact 17 associated with stationary contact 16 being connected to a negative source of potential via a resistor 18. A capacitor 19 is connected between ground and a movable contact 20 having its associated normally closed stationary contact connected to conductor 11 and its normally open stationary contact connected to a negative source potential.

Movable contacts 17 and 20 are part of a relay circuit 21 which also controls movable contact 22 to control energization of tape recorder 5 from the power lines. Flip flop circuit 7 controls the relay circuit so when the flip flop circuit is in the state which activiates the radio channels, the relay contacts are in the positions shown.

In considering the operation of the system assume that the system is intitially providing background music and that accordingly gain circuit 4 is activated so that radio 1 is coupled to output amplifier 2 and speaker 3. Timer 15 is set to periodically initiate switching from the background music to a recorded announcement from tape recorder 5. This is accomplished by closing contacts 14 so that capacitor 12 is charged negatively via resistor 18. As the capacitor charges, the potential on conductor 11 becomes increasingly negative thereby reducing the gain of the variable gain circuits toward cut off thereby fading out the background music. Amplitude detector 8 is set to respond to a pause of approximately one second in duration and hence will eventually provide a pulse to flip flop circuit 7 to change the state thereof. When the state of the flip flop circuit changes, variable gain circuit 6 becomes activated in place of circuit 4 and relay circuit 21 becomes activated to change movable contacts 17, 20 and 22 to their alternate positions. Movable contact 22 energizes the tape recorder and movable contact 17 disconnects resistor 18 to terminate the charging of capacitor 12. The charge on the capacitor then leaks off through parallel resistor 13 and therefore the negative potential on conductor 11 decreases toward ground. As a result, the gain of variable gain circuit 6 increases to gradually fade in the tape recorder 5.

While the recorded message from tape recorder 5 is passing through gain circuit 6 and amplifier 2, capacitor 19 is being charged via contacts 20. At the end of the recorded message there will be a pause which is detected by amplitude detector 8 which in turn changes the state of flip flop circuit 7. This change of state activates variable gain circuit 4 and de-energizes relay circuit 21 so that the movable contacts 17, 20 and 22 return to their initial positions as shown in FIGURE 1. Charged capacitor 19 is therefore connected in parallel with capacitor 12 by means of movable contact 20 to place a negative potential on conductor 11 which cuts off both variable gain circuits. Thereafter, the charge on capacitors 19 and 12 leaks off through resistor 13 and the potential on conductor 11 gradually decreases to zero to increase the gain of the gain circuits thereby fading in the music from radio 1.

A detailed schematic diagram of the system is set forth in FIGURE 2 and includes the control circuit 10 which is essentially the same as previously described in FIGURE 1 and therefore like reference numerals are employed Conductor 11 carries the output signal from the control circuit and is connected to the supressor grids of variable-mu pentodes 30 and 31 in variable gain circuits 4 and 6 respectively. When the potential on conductor 11 is essentially zero or ground, the pentodes operate in normal fashion to amplify the signal on the control grid, but as the potential on conductor 11 becomes increasingly negative, this negative potential on the supressor grids gradually drives the tubes toward cut off. Resistor 18 is shown connected to a negative 45 volt potential which is adequate to drive the tubes 30 and 31 into cut off. Capacitor 19 is connectable to a negative 140 volts source via movable contact 20. This provides a sufficient charge to drive the tubes into cut off after the charge is equalized between capacitors 19 and 22.

The plates of tubes 30 and 31 are connected to a positive 250 volt source via a common plate resistor 32 and another series connected resistor 33. The junction between resistors 32 and 33 is coupled to ground via a bypass capacitor 34 and is also connected to the screen grids of tubes 30 and 31 via a resistor 35. The common screen grid connection is coupled to ground via a bypass capacitor 36. The cathodes of tubes 30 and 31 are connected together and have a common biasing circuit including cathode resistor 37 connected between the cathodes and ground, and a parallel bypass capacitor 38.

The output from radio 1 is connected across a variable resistor 40 and the movable contact thereof is coupled to the control grid of tube 30 via a coupling capacitor 41. The output signal from tape recorder 5 is similarly developed across a variable resistor 42 and the movable contact of this variable resistor is coupled to the control grid of tube 31 via a coupling capacitor 43. As will be explained hereinafter, flip flop circuit 7 provides a negative bias to the control grid of one of the tubes 30 and 31, and this negative bias drives that the tube into cut off. Accordingly, only one of the audio signals can pass through its respective tube to develop an output signal across plate resistor 32.

The output from the variable gain circuits is taken from common plate resistor 32 and is connected to the grid of a triode 50 in a cathode follower circuit forming part of output amplifier 2. A coupling capacitor 51 is connected between the variable gain circuits and the control grid of tube 50 and a grid resistor 52 is coupled between the grid and ground. The plate of tube 50 is connected directly to the positive 250 volt source and the cathode thereof is connected to ground via an unbypassed cathode resistor 53. The output signal is developed across resistor 53 and is supplied to the remaining audio amplifier stages leading to the loud speaker. This signal corresponds to either the output signal from radio 1 or the output signal from tape recorder 5 depending upon the state of flip flop circuit 7 which in turn activates one or the other of the variable gain circuits.

The cathode following output signal appearing at the cathode of tube 50 is also coupled to the grid of a triode tube 60 in the amplitude detector circuit 8. This connection includes a coupling capacitor 61 in series with resistors 62 and 63 which provide a voltage divider coupled to the control grid of tube 60. The plate of tube 60 is connected to the positive 250 volt supply via a plate resistor 64, and the bias for the tube is provided by a cathode resistor 58 and parallel bypass capacitor 59 connected between the cathode and ground. The output signal for tube 60 is developed across plate resistor 64 and corresponds to the output signal from the cathode follower circuit.

One side of a capacitor 65 is connected to the plate of tube 60, and the other side is connected to the plate of a diode 67 and the cathode of a diode 66. The cathode of diode 67 is connected to ground and the plate of diode 66 is connected to the control grid of thyratron 70 via a resistor 68. The audio signal developed across resistor 64 passes through capacitor 65 and thereafter diode 67 bypasses the positive portion of this signal to ground while diode 66 passes the negative portion of this audio signal to the control grid of thyratron 70.

Capacitor 71 is connected between ground and the junction between resistor 68 and the plate of diode 66. This capacitor has a resistor 72 connected in parallel to thereby provide a time delay circuit which smooths the rectified audio signal passing through diode 66. Accordingly, the signal appearing on the control grid of the thyratron corresponds to the average amplitude value of the audio signal. The time constant of capacitor 71 and resistor 72 is selected so that momentary pauses in the output signal will not affect the thyratron. In practice a time delay of approximately one second has been found adequate to prevent inadvertent switching between channels because of short pauses in the audio signal.

The plate voltage for thyratron 70 is provided by a capacitor 73 connected between the plate and ground. The non-grounded side of capacitor 73 is coupled to the positive 250 volt supply via a charging resistor 74. Resistor 74 is quite large (100 megohms) and is selected so that it passes sufficient current to permit charging of capacitor 73 but still does not pass sufficient current to maintain thyratron 70 in a conductive state. The plate of thyratron 70 is connected to the trigger input of flip flop circuit 7 which appears at the cathode of a dual diode tube 80.

When an audio signal is presented at the output of the cathode follower, a negative signal is applied to the control grid of thyratron 70 and maintains the thyratron in a nonconductive state. When there is a pause in the audio signal, the potential across capacitor 71 is dissipated through resistor 72 and the thyratron grid potential decreased toward zero. Eventually the thyratron fires and discharges capacitor 73 to provide a negative pulse which passes through capacitor 75 to the trigger input of the flip flop circuit.

Flip flop circuit 7 includes a pair of triodes 81 and 82 each having their cathodes connected to ground and their plates connected to the positive 250 volt supply via plate resistors 83 and 84. The plate of tube 81 is coupled to the grid of tube 82 by means of a coupling network including a capacitor 85 and parallel a resistor 86, and the plate of tube 82 is similarly coupled to the grid of tube 81 via a coupling network including a capacitor 87 in parallel with a resistor 88. The grids of tubes 81 and 82 are connected to a negative 150 volt supply via resistors 89 and 90 respectively. The triggering input pulses are applied to the flip flop circuit via the connections between the plates of dual diode 80 and the plates of tubes 81 and 82. The output signals are taken from the grids of tubes 81 and 82, i.e. junctions 98 and 99 respectively. Junction 98 is connected to the grid of tube 30 via a decoupling network including series resistors 91 and 93 and a capacitor 92 connected between the junction of the resistors and ground. Similarly, junction 99 is connected to the control grid of tube 31 via a decoupling network including resistors 94, 96 and a capacitor 95. These decoupling networks prevent the switching transients of the flip flop circuit from affecting tubes 30 and 31. The decoupling circuits also provide a time delay which prevents activation of a variable gain circuit prior to the switching of contacts 17 and 20 in control circuit 10.

Because of the cross coupling in the flip flop circuit, one of the tubes is driven into saturation while the other is at cut off. Assume that tube 81 is saturated and tube 82 is at cut off. Under these circumstances resistors 84, 88 and 89 provide a voltage divider which maintains the potential at junction 98 at ground. Accordingly, the flip flop circuit does not provide a cut off bias to tube 30 and therefore the signal from radio 1 can pass through capacitor 41 to the grid of tube 30 where the audio signal is amplified and passes to the output amplifiers via the cathode follower. Tube 82 in the flip flop circuit is maintained at cut off by the highly negative potential appearing at junction 99. This negative potential likewise appears at the control grid of tube 31 and maintains this tube at cut off so that the signal from tape recorder 5 is effectively blocked.

When a negative pulse is applied to the cathode, of tube 80, this negative pulse passes through capacitor 87 to momentarily drive the grid of tube 81 negative thereby driving tube 81 from saturation toward cut off. As a result, the flip flop circuit changes state and therefore tube 82 is now in saturation and tube 81 is at cut off. The potential at junction 99 is zero and therefore the signal from tape recorder 5 can pass through tube 31. The signal at junction 98 is negative driving tube 30 into cut off thereby blocking the signal from radio 1.

Junction 99 of the flip flop circuit is also connected to the control grid of the relay driver tube 100. The cathode of tube 100 is connected to ground and the plate thereof is connected to a positive 250 volt supply via the coil of a relay 101. A capacitor 102 is connected in parallel with the coil to absorb inductive switching transients. Movable contacts 22 and 103 are associated with relay 101, contacts 22 being in the power line supply circuit for tape recorder 5. Contacts 103 are connected in series with a resistor 104 and the coil of a relay 105 between the positive 250 volt supply and ground. A capacitor 106 is connected in parallel with the coil of relay 105 to absorb the inductive transients. Relay 105 includes movable contacts 17 and 20 in control circuit 10.

When tube 81 in the flip flop circuit is conductive, thereby activating tube 30 and permitting the audio signal from the radio to pass through to the output amplifiers, junction 99 is negative and therefore tube 100 is cut off. Accordingly, neither of relays 101 or 105 is energized and therefore the contacts are in the positions indicated in FIGURE 2. However, when the flip flop circuit changes state, tube 100 goes into saturation thereby energizing relays 101 and 105.

While only one illustrative embodiment of the invention has been described in specific detail it should be noted that there are numerous variations within the scope of the invention. The invention has been described using vacuum tube circuits which presently provide better performance in audio systems. However, it should be perfectly obvious that essentially the same type system can be constructed using solid state circuitry. Furthermore the invention has been described specifically as a system for injecting annoucnements into a background music system, but the invention is by no means limited to this particular arrangement and could be used to periodically switch between many different types of audio signals. Also, more than two audio input channels could be employed by replacing the flip flop circuit by a ring counter type circuit which would progressively select between the individual variable gain circuits associated with the audio channels.

The invention is more particularly defined in the appended claims.

What is claimed is:

1. A multiple channel audio system, comprising:
a music channel;
a recorded message channel including a recording device for reproducing a previously recorded message when activated;
an output amplifier;
a first gain control circuit connected between said music channel and said amplifier, a second gain control circuit connected between said message channel and said amplifier, the gain control circuits being operative to, when activated, couple the associated channel to said amplifier;
a flip flop circuit connected to activate one or the other of said gain control circuits;
a signal level detection circuit connected between said amplifier and said flip flop circuit to change the state of said flip flop circuit whenever the signal in said amplifier becomes insignificant;
first circuit means connected to said gain control circuits to periodically reduce the gain therein to initiate transfer to said message channel, and to increase the gain thereof after said transfer; and
second circuit means connected to said gain control circuits to reduce the gain therein in response to the pause following completion of a recorded message, and to thereafter increase the gain.

2. A multiple channel audio system in accordance with claim 1 wherein
said first circuit means gradually reduces said gain to fade out said music channel, and after said transfer, gradually increases said gain to fade in said message channel, and
said second circuit means gradually increases said gain to fade in said music channel.

3. A multiple channel audio system in accordance with claim 2 wherein
said first and second gain control circuits each include a variable -mu pentode tube,
said first circuit means includes
a first capacitor connected to the suppressor grids of said tubes and which is charged negatively to gradually decrease the gains of said tubes and
a resistor connected in parallel with said first capacitor to discharge said capacitor and gradually increase the gains of said tubes, and
said second circuit means includes a second capacitor which, in charged condition, is connected in parallel with said first capacitor to rapidly reduce the gains of said tubes, said capacitors thereafter being discharged through said resistance to gradually increase the gains of said tubes.

References Cited

UNITED STATES PATENTS

| | | |
|---|---|---|
| 3,147,346 | 9/1964 | Herman. |
| 2,766,378 | 10/1956 | Sundin et al. |
| 3,374,316 | 3/1968 | Slaats et al. |

OTHER REFERENCES

Smaller, Philip, "Automatic Programming Cuts Broadcasting Costs," Electronics Magazine, October 1955, pp. 135–137.

RALPH D. BLAKESLEE, Primary Examiner

U.S. Cl. X.R.

179—100.1